United States Patent [19]

Hayakawa

[11] Patent Number: 4,563,759
[45] Date of Patent: Jan. 7, 1986

[54] METHOD OF AND SYSTEM FOR THREATENING PESTS

[75] Inventor: Hideo Hayakawa, Ibaragi, Japan
[73] Assignee: Tokyo Elite Co., Ltd., Tokyo, Japan
[21] Appl. No.: 601,405
[22] Filed: Apr. 17, 1984
[30] Foreign Application Priority Data Jun. 17, 1983 [JP] Japan ................................ 58-107623

[51] Int. Cl.⁴ .............................................. H04B 1/02
[52] U.S. Cl. ................................ 367/139; 340/384 E
[58] Field of Search ..................... 367/139; 340/384 E; 43/124

[56] References Cited

U.S. PATENT DOCUMENTS 3,886,492  5/1975  White .................................. 367/139
4,105,992  8/1978  Luciano ............................... 367/139
4,213,121  7/1980  Learn et al. ...................... 340/384 E
4,219,884  8/1980  De Santis ............................ 367/139

Primary Examiner—Theodore M. Blum
Attorney, Agent, or Firm—Armstrong, Nikaido, Marmelstein & Kubovcik

[57] ABSTRACT

A method of and system for threatening noxious animals and insects or pests such as rats or mice, pigeons, cockroaches and the like in an area by sonifying the area with an ultrasonic energy. An electrical signal which randomly fluctuates in frequency in a certain range on a central frequency and contains an impacting part changing sharply in frequency from rapid drop to rapid rise is prepared and emitted from a transducer as mechanical ultrasonic oscillation.

1 Claim, 4 Drawing Figures

METHOD OF AND SYSTEM FOR THREATENING PESTS

BACKGROUND OF THE INVENTION

1. Field of the Invention

The present invention relates to a method of and system for threatening noxious animals and insects such as rats or mice, pigeons, cockroaches and the like (hereinafter referred generally to as "pests") and more particularly to those which use a mechanical oscillation of acoustic signal or the like to get rid the pests from a sonifying area and to prevent same from entering thereto.

2. Prior Arts

The pests, more particularly the rats not only stealingly eat a human food reserved in a storehouse or the like but also are often a carrier of infectious desease. Therefore, various measures for getting rid of those have been taken.

The most common technique is set out a poison but this has obvious drawbacks.

In recent years, it has been found that the pests are quite averse to an acoustic signal of a certain frequency range, so that in case of the rats, an emission of such acoustic signal to an inhibiting area thereof such as a storehouse, ceiling or the like and an entrance or passage thereto is effective for getting rid same therefrom and preventing same from entering thereto. Therefore, various system for utilizing the finding have been developed and actually employed. Such a system emits the acoustic signal of a specific frequency in an ultrasonic range of 18 to 40 KHz, since some pests are sensitive only to frequencies at the low end while other pests are sensitive to frequencies at the high end but said range covers the frequencies, in which almost all of pests will be affected.

Such a conventional system is certainly effective in an early period after its installation but the pests eventually and gradually adapt themselves the sonified circumstance, so that a threatening effect of the system shall be lost in an early stage. Of course, the effect can be sustained in some extent by increasing an output level or intensity of the ultrasonic energy but this technique may give an injury to pet and domestic animals as well as human body.

An emission of ultrasonic signal, a frequency of which varies regularly with time has also been tried but the pests eventually obtain an immunity against such signal, when they are exposed to the ultrasonic energy for a prolonged period.

As measures to give no immunity to the pests while avoiding the increase of output intensity, various methods have been proposed. For instance, Jap. Examined Pat. Appln. Gazette No. 38 588/1975 teaches a use of AM ultrasonic pulse wave of 25 KHz which is emitted under an output range of 380 to 600 mw synchronizedly with a flashing light pulse wave. Jap. Unexamined Pat. Appln. Gazette No. 86 376/1978 (corresponding to U.S. Ser. Nos. 738,807 and 840,061) discloses an alternative emission of two kinds of ultrasonic pulse signals, wherein a frequency randomly varies in the range of about 18 to 25 KHz and about 23 to 30 KHz, respectively. Further, Jap. Unexamined Pat. Appln. Gazette No. 5 128/1982 proposes to emit an ultrasonic signal containing a plurality of frequency components, which signal is prepared by making modulation of a pulse width on a carrier wave (100 to 250 KHz) with various frequencies, to which the pests are sensitive, namely about 25 KHz (aversing frequency for rats), about 24 to 25 KHz (communication frequency between female and male rats) and about 37 to 43 KHz (usual communication frequency range for rats), so as to make unable normal communication of the exposed pest and accelerate its madness.

Turning now to that I, the inventor had found that a sustaining threatening effect similar to that in said methods can be obtained by emitting intermittently an ultrasonic signal which is irregular in emitting time period and interval of the signals and randomly varies in frequency thereof and then filed a patent application in Japan [Jap. Pat. Appln. No. 23 673/1982 (Jap. Unexamined Pat. Appln. Gazette No. 141 742/1983 issued Aug. 23, 1983)].

As a result of various studies and experiments having been made with use of a system which embodies the invention as disclosed in my said Japanese patent application (Jap. Pat. Appln. No. 23 673/1982), it has been found that there is a distinctive interrelation between a curve showing fluctuation in frequency and a pest threatening effect.

OBJECT OF THE INVENTION

A main object of the present invention is to provide a method of and system for threatening pests, which are improved far from the system as disclosed in my said Japanese patent application.

Another object of the present invention is to provide a method of and system for threatening pests, which does not give any injury to pet and domestic animals as well as human body and shows a good and sustaining threatening effect to the pests, even if an output signal thereof is low.

SUMMARY OF THE INVENTION

The objects of the present invention is attained by emitting an ultrasonic pest threatening signal which is random and contains impacting or shock parts, each changing from a rapid drop to a rapid rise in frequency.

DETAILED DESCRIPTION OF THE INVENTION

Figure 1:
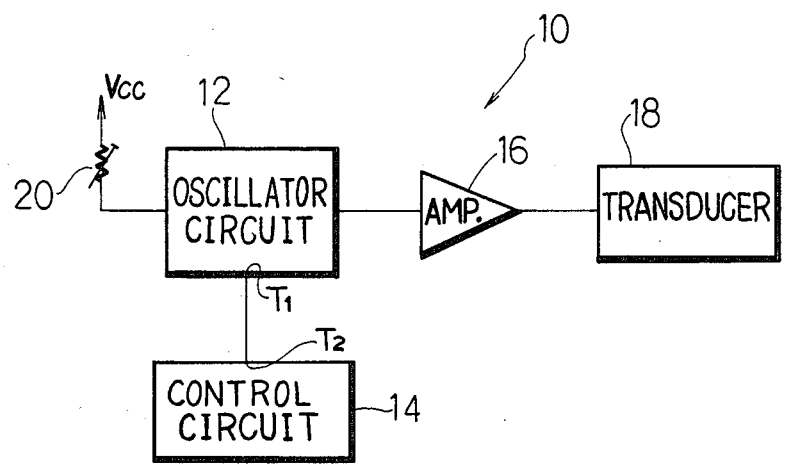
FIG. 1 is a block diagram showing an embodiment of the system according to the present invention.

In the drawings, a pest threatening sonic system according to the invention is shown in FIG. 1. The system 10 comprises essentially an oscillator circuit 12, a circuit 14 for controlling the oscillator circuit 12, a circuit 16 for amplifying an output signal from the oscillator circuit 12, and a transducer 18 for converting an electrical output signal from the amplifier circuit 16 into a mechanical oscillation. The oscillator circuit 12 is a variable frequency type one and its output frequency varies by a voltage signal appearing at a terminal $T_1$ under control of the control circuit 14. A fluctuation in the output frequency by the control signal is about ±2 to 3 KHz on a central frequency which can optionally be selected from values of about 3 to 40 KHz by adjusting a variable resistor (semi-solid resistor) 20.

The amplifier circuit 16 amplifies the output signal of said oscillator circuit 12 and transfers same to the transducer 18. In this embodiment, a piezo-speaker is employed as the transducer.

The control circuit 14 incorporates a random signal generator and makes appear at a terminal $T_2$ a voltage signal which varies depending on a random signal to be issued from the random signal generator, said voltage signal being fed to the terminal $T_1$ of the oscillator circuit 12 for its output frequency control.

Figure 2:
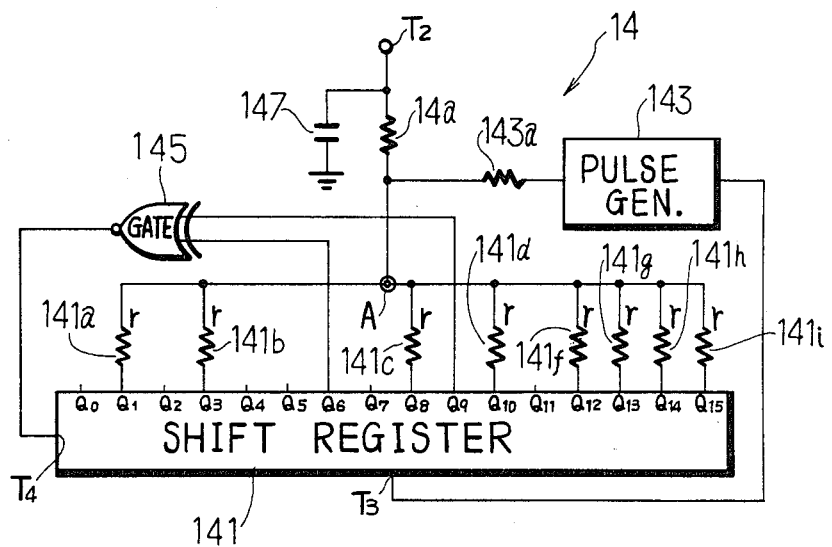
FIG. 2 is a block diagram showing an embodiment of a control circuit for the system.

FIG. 2 shows an embodiment of the control circuit 14. The control circuit comprises a shift register 141, a pulse generator 143 and a gate 145. The shift register 141 has 16 stages and informations stored therein can be read out in parallel from terminals $Q_0$ to $Q_{15}$. A shift operation of the shift register 141 is controlled by a shift pulse signal to be fed from the pulse generator 143 and appeared at a terminal $T_3$.

The gate 145 is a so-called "exclusive OR gate" which outputs signal "1" when signals inputted in both input terminals are same and otherwise outputs signal "0", so that the gate serves as a coincidence detection circuit. A signal outputted from one of even stages of said shift register 141, for instance from the 6th stage ($Q_6$) is inputted to one of the input terminals of the gate 145 and the other input terminal receives a signal outputted from one of odd stages of said shift register 141, for instance from the 9th stage ($Q_9$). A result of the coincidence detection by said gate 145 is inputted to the lowermost stage $Q_0$ of the shift register 141 through its terminal $T_4$. This information is shifted to upper stages one by one to store in the shift register 141 as random informations.

The random information stored in the shift register 141 is picked up from about a half of said stages through concerned resistors 141a to 141i which are solid resistors, each having a value in a range of several KΩ to 15 KΩ. In this embodiment, the random information is picked up one of the 1st, 3rd, 8th, 10th and 12th to 15th stages. The resistors 141a to 141i connect the terminals $Q_1$, $Q_3$, $Q_8$, $Q_{10}$, $Q_{12}$ to $Q_{15}$ to a common point A which is, in turn, connected to the output terminal $T_2$ through a resistor 141a. If a pattern of the random informations stored in each stage changes, therefore, a combined resistance of said resistors 141a to 141i connected to lower and higher level stage terminals varies to cause a voltage fluctuation in both of the point A and terminal $T_2$, so that a random voltage signal is formed to fed from the terminal $T_2$ of the control circuit 14 to the terminal $T_1$ of the oscillator circuit 12.

The pulse generator 143 generates continuously pulses having a central frequency of, for instance 50 KHz and a pulse repeating cycle thereof changes depending on a voltage value of a signal inputted thereto. A fluctuation in output frequency is about ± several Hz. To the input terminal of the pulse generator 143, the voltage of said point A is supplied through a resistor 141a. Therefore, the pulse repeating cycle of the pulse generator 143 fluctuates depending on the random signal due to said shift register 141 which, in turn, uses as the shifting pulse the output of the pulse generator 143. As a result, the control signal appearing at the terminal $T_2$ randomly varies in both of its voltage value and fluctuation cycle.

It is to be noted that the control signal is prepared by utilizing the pattern of random informations stored in about half of the stages in said shift register 141, there is an offset in the employed stages (in the illustrated embodiment, the higher stages are more employed in number than the lower stages), and, as aforesaid, the coincidence detection result of informations selected from each one stage of even and odd stages is employed as the input information for the shift register 141 and thus sharp fluctuations in voltage value will appear frequently in the control signal and there is no possibility of that same fluctuation pattern is repeated in a relatively short period of time.

Figure 3:
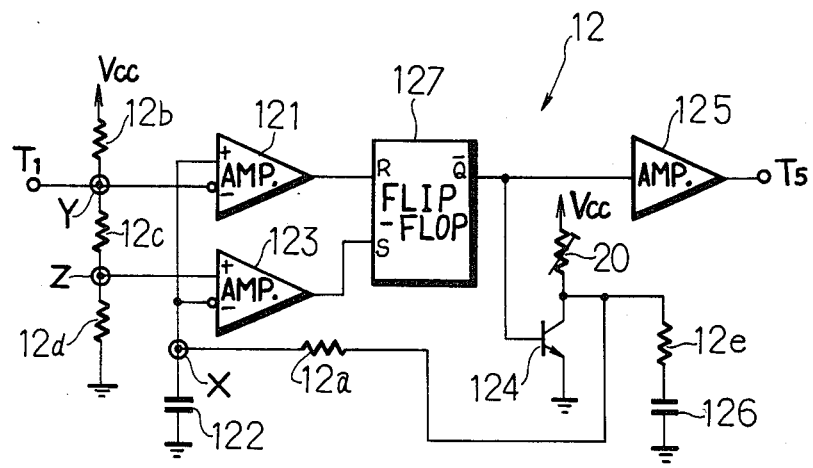
FIG. 3 is a block diagram showing an embodiment of an oscillator circuit for the system.

FIG. 3 shows one of embodiments of the oscillator circuit 12. The oscillator circuit 12 comprises 3 amplifiers 121, 123 and 125 as well as a flip-flop 127. The flip-flop 127 is reset by an output of the amplifier 121 and set by an output of the amplifier 123. The amplifiers 121 and 123 are differential type one, so that a positive output is issued when a potential of its positive input terminal is higher than that of its negative input terminal. To the positive and negative input terminals of the amplifier 121, potentials at points X and Y are supplied, respectively, and an output thereof is supplied to a reset terminal of the flip-flop 127. To the positive and negative input terminals of the other amplifier 123, potentials at points Z and X are supplied, respectively, and an output thereof is supplied to a set terminal of the flip-flop 127.

The potential at point X is determined by charge stored in a capacitor 122 which is charged by a power source $V_{cc}$ through the variable resistor 20 (see also FIG. 1) and a resistor 12a, when a transistor 124 is in "OFF" and discharged to earth through the resistor 12a, when the transistor 124 is in "ON". The transistor 124 is made "OFF" or "ON" depending on that the flip-flop 127 is set or reset.

In other words, during the state of that the transistor 124 is in "OFF", the capacitor 122 is charged gradually to increase the potential at point X. When the potential at the point X exceeds that at point Y, the flip-flop 127 is reset, so that the transistor 124 is turned "ON" to cause discharge of the capacitor 122. If the potential at point X drops down to a level lower than that at point Z due to the discharge, the flip-flop 127 is set to make the transistor 124 "OFF". Such an operation sequence is recycled to repeat the set and reset of the flip-flop 127. Therefore, a repeating cycle of the set and reset operations of said flip-flop 127 is made longer, if a potential difference between the points Y and Z and vice versa.

A resistor 12b is one for producing a positive potential difference between points Y and Z and thus the potential at point Y is determined by the control signal inputted from the control circuit 14 (FIG. 2) to the terminal $T_1$. The potential at point Z can be calculated by dividing the potential at point Y with a combined resistance of resistors 12c and 12d. Therefore, if the voltage of the control signal is made larger, the potential difference between points Y and Z is made larger and vice versa. This means that if the voltage of the control signal is made larger, the set-reset repeating cycle of the flip-flop 127 is made longer and vice versa. The state of this flip-flop 127 is picked up through the amplifier 125 and outputted from a terminal $T_5$ as an output of the oscillator circuit 12.

This set-reset repeating cycle of the flip-flop 127, namely an oscillation frequency of the oscillator circuit 12 can be changed by adjusting the semi-solid resistor 20 (see also FIG. 1), since if the semi-solid resistor 20 is adjusted, a charging time constant of the capacitor 122 and setting time of the flip-flop 127 vary to change the oscillation frequency.

An operation of the threatening system 10 having such structures will be explained below.

In the first place, the semi-solid resistor 20 is adjusted to set a central frequency of the oscillator circuit 12 to, for instance, about 33 KHz which is most sensitive to Egyptian rats. When the system 10 is connected to a power source (not shown), the control circuit 14 functions as aforesaid to issue the control signal from the terminal $T_2$, which control signal has randomly been varied in its voltage value and period of time for sustaining the voltage value, under the control by the random control signal generator comprising the shift register 141, pulse generator 143 and gate 145. Further, this randomly varying control signal contains, as aforesaid, the sharp fluctuation part in voltage value and this part frequently appears therein.

The control signal issued from the terminal $T_2$ of the control circuit 14 is supplied to the terminal $T_1$ of the oscillator circuit 12 to control output frequency of the latter circuit. Therefore, an output of the oscillator circuit 12 randomly varies between 33± about 3 KHz in frequency and also randomly varies between 1/44 to 1/55 second in frequency sustaining period of time. This output signal issued from the terminal $T_5$ of the oscillator circuit 12 contains an impacting or shock part which sharply fluctuates in frequency from a rapid down to a rapid rise and corresponds to the sharp fluctuation in said control signal.

Figure 4:
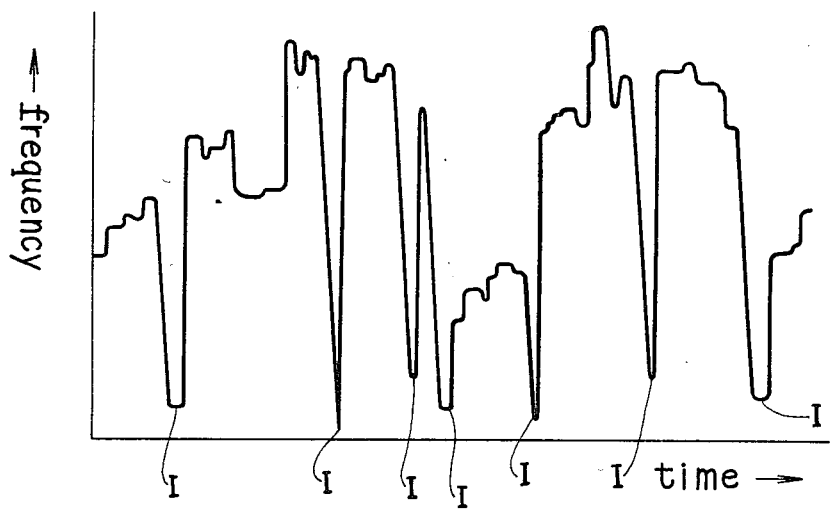
FIG. 4 is a graph showing a wave form of a threatening signal to be emitted by the system.

FIG. 4 shows one of wave form of the output signal as a threatening one to be issued from the oscillator circuit 12, wherein time and frequency are plotted in axes of abscissa and ordinate, respectively. The impacting or shock parts are indicated in the Figure with reference symbols "I". The threatening signal is amplified by the amplifier circuit 16 and then supplied to the transducer 18 which, in turn, converts the electrical threatening signal into ultrasonic signal to emit same in the air.

Experiments showed that the rats exposed to such an ultrasonic threatening signal madly run for trying to escape from the sonified area or squat down at a corner of the area and particularly at each of the impacting or shock part "I" in the threatening signal, they twitch their legs, tail, ear and others, ruffle up their fur and madly behaves. These behaviors are judged as that the ultrasonic wave reflected on a peripheral wall of the sonified area, in their ear or the like and a freshly entered ultrasonic wave interferes and particularly on the impacting or shock part, a sharp change in frequency is caused in such ultrasonic reverberation to give an abnormal excitement to their acoustic nerve.

As a result of the experiments, it has been found that the rats are greater damaged by the threatening signal, when its frequencies change continuously from one to another, in comparison with a case of that frequencies change stepwisedly, and that a sharp change thereof is more effective. The former can be attained by a capacitor 147 connected between the terminal $T_2$ and earth in FIG. 2 (the control circuit 14) and the latter a combination of the shift register 141, the pulse generator 143 and the gate 145, as aforesaid. It has further been found that more greater damage can be given to the rats, when in each of the impacting or shock parts I, the decrease or lowering in frequency is made somewhat gentle to cause a reverberation effect and then the frequency is rised up rapidly in more higher steep. As a measure for this purpose, a time-constant circuit is incorporated in the oscillator circuit 12 (FIG. 3), which consists of a capacitor 126 and a resistor 12e.

It is to be noted that the threatening signal issued by the system according to the present invention randomly varies on the central frequency to be set in most sensitive one to the objective pest and contains the impacting or shock part which frequently appears therein, whereby the pest can not grow any familiar thereto and the threatening effect sustains over a longer period of time, even if an output power thereof is low. In fact, the experiments showed that in case of rats as the pest, they suffer one of neuroses within about one night in an acoustic area of the threatening signal to show no seek on food, madly running and attacking or devouring one another, so that they become extinct within about a few days even in a longer case.

While preferred embodiments of the invention have been shown and described herein, it is to be noted that the invention is, of course, not limited thereto. For instance, a number of stages for the shift register can optionally be selected, a voltage of the control signal and sustaining period of time therefor may be controlled by another suitable random signal generation circuit, and the oscillator circuit may be controlled by a signal other than the voltage signal, for instance current signal. The impacting or shock parts may be prepared by a separate circuit to combine the same with a random signal having no or slight sharp fluctuation, so as to synthesize the control signal. Two or more transducers may be connected to a common oscillator circuit, from an economical view point. In case of that the purpose lies in catch of the pest, it is preferable to stop an actuation of the system for about 10 minutes, since an excessive threatening operation greatly inhibits a move of the pest.

In case of cockroaches and the like living under cover, it is preferable to use a vibrator as the transducer to directly cause a mechanical vibration.

For threatening noxious birds such as pigeons, sparrow, gray starling and the like, speakers of a trumpet one, tweeter or a combination thereof can be employed as the transducer.

I claim:

1. A system for threatening pests by sonifying an area with ultrasonic energy emission, comprising:
   an oscillator circuit,
   a control for generating a control signal which is fed to said oscillator circuit to change an oscillation frequency from said oscillator circuit,
   an amplifier circuit to amplify an output of said oscillator circuit; and
   a transducer connected to said amplifier circuit for converting an electrical output from said amplifier circuit to a mechanical oscillation to emit same as the ultrasonic energy to the area,
   said control circuit having therein a random signal generator to form and feed to said oscillator circuit the control signal which randomly fluctuates in its voltage level and contains a sharply fluctuating part in the voltage level, based on random signals issued from said random signal generator, whereby said oscillator circuit causes a random and continuous change in its oscillation frequency, in response to to the voltage fluctuation in such control signal from said control circuit and generates an impacting portion in its output electrical signal at the sharp fluctuating part in the control signal, the oscillation frequency sharply changing from a rapid drop to a rapid rise at the impacting portion, wherein said random signal generator is formed by a shift register having plurality of stages to store information patterns, a pulse generator for controlling a shift operation of said shift register and an exclusive OR gate as a coincidence detection circuit, which gate inputs a result of the detection to a lowermost stage of said shift register shifting information to upper stages one by one under control of a pulse signal issued from said pulse generator to prepare a signal which is random in voltage value depending on the information in the selected stages of said shift register and which controls a pulse repeating cycle of said pulse generator and is fed to said oscillator circuit to control same.

* * * * *